Patented Sept. 11, 1945

2,384,550

UNITED STATES PATENT OFFICE 2,384,550

NEUTRAL ESTERS OF POLYBASIC ALIPHATIC ACIDS WITH HYDROXY COMPOUNDS OF THE ANDROSTANE AND PREGNANE SERIES AND A PROCESS OF MAKING THE SAME

Hans Herloff Inhoffen, Berlin-Wilmersdorf, Germany, assignor to Schering Corporation, Bloomfield, N. J., a corporation of New Jersey No Drawing. Application February 14, 1940, Serial No. 318,844. In Germany February 16, 1939

17 Claims. (Cl. 260—397.4)

This invention relates to neutral esters of polybasic aliphatic acids with hydroxy compounds of the androstane and pregnane series and a process of making the same.

It has been found that new therapeutically valuable compounds are obtained by esterification of hydroxy compounds of the androstan and pregnan series (that is, compounds of the $C_{19}$ and $C_{21}$ series) with polybasic acids preferably of the aliphatic series yielding neutral esters. Such esters are obtainable if the polybasic acids are employed in the form of the corresponding acid halogenides according to known methods, as they are described, for instance, in the text book of Houben-Weyl "Die Methoden der organischen Chemie," vol. 2 (1922), pages 476–548, especially in the presence of a base, preferably of pyridine.

Suitably one may proceed in such a manner that first acid esters are produced which are obtainable by known methods by reacting dicarboxylic acid anhydrides on alcohols of the steroid series, transforming said acid esters into the halogenide and then reacting the same with another mol of the steroid alcohol so as to form the neutral ester. But it is also possible to esterify to neutral esters the intermediate products of steroids produced in any manner containing a hydroxy group or a group which may be transformed into a hydroxy group, by means of polybasic acids, employed in the form of their halogenides or anhydrides. In case the steroids contain free ketogroups on the one hand and esterified or etherified hydroxy groups or enolice ether or acetal groups on the other hand the first mentioned groups may be transformed to hydroxy groups and subjected to esterification with polybasic acids, whereby the ester, ether, enolic ether and acetal groups situated preferably on the carbon atom 3, being easier to split off, may be retransformed by means of hydrolizing agents to hydroxy or keto groups and the hydroxy groups may be oxidised to ketogroups if necessary.

As steroid compound suitable as starting material there may be mentioned androstenol-17-one-3 and as esterifying agent, for instance, the succinic acid anhydride or the succinic acid dichloride. In the place of succinic acid there may also be employed glutaric acid, phthalic acid, maleic acid and so on or their anhydrides or halogenides. The steroid compound may also be a saturated or unsaturated compound of the androstan and pregnan series containing a free hydroxy group capable of esterification. Said compounds may also contain other substitutions in their molecule. Especially valuable compounds are obtained by producing the neutral esters of the succinic or glutaric acid from testosterone or 21-hydroxy-progesterone.

The following examples illustrate the invention without, however, limiting the same to them.

*Example 1*

To a solution of 557 mgs. of the acid succinic ester of testosterone in 22 ccs. of benzene there is added a solution of 0.1 cc. of thionyl chloride, freshly distilled, in 5 ccs. of benzene at room temperature. The mixture is allowed to stand for 4 hours. Then the benzene is distilled off at 25–30° C. The residue is dissolved in a solution of 414 mgs. of testosterone in 5 ccs. of dried pyridine and allowed to stand over night. Then the mixture is treated about ½ hour on the water bath, poured into an aqueous solution of sodium bicarbonate and shaken with ether. The neutral succinic ester of testosterone being difficultly soluble precipitates for the most part. It is collected by filtration or decantation and forms a fine powder after washing with ether. The melting point of this crude product is about 218° C. with decomposition. After recrystallisation from a mixture of chloroform and methanol it rises to 225° C.

When tested in the capon's comb test this substance shows with 50 γ a pronounced androgenic action of long duration if given in a single injection.

*Example 2*

To a solution of 2.9 gs. of testosterone in 50 ccs. of dried pyridine a solution of 10 gs. of glutaric acid dichloride is added and the mixture allowed to stand for 16 hours at room temperature. Then it is poured into an aqueous solution of 10% sodium bicarbonate and extracted with ether. The ethereal solution containing the neutral parts of the reaction mixture is filtered, mixed with alcohol and concentrated. Thereby the neutral glutaric ester of testosterone crystalizes. After repeated recrystallisation from a mixture of chloroform and alcohol it shows a melting point of 252° C. Yield about 2 gs.

When tested in the capon's comb test this ester shows with 50 γ a pronounced androgenic activity of long duration if given in a singe dose.

Of course, many other changes and variations in the reaction conditions, the solvents used, temperature and duration of reaction, working up and purification of the reaction products, and the like may be made by those skilled in the art in accordance with the principles set forth herein and in the claims annexed hereto.

What I claim is:

1. Process for the manufacture of neutral esters of steroid compounds containing hydroxy groups capable of being esterified, and polybasic acids, comprising reacting a hydroxy steroid compound of the $C_{19}$ and $C_{21}$ series with a member of the group consisting of polybasic carboxylic acid polyhalogenides and polybasic carboxylic acid halogenides partially esterified with said steroid compound, until a neutral ester is obtained.

2. Process according to claim 1 comprising employing a hydroxycompound of the androstane series as starting material.

3. Process according to claim 1 comprising employing a hydroxy compound of the pregnane series as starting material.

4. Process according to claim 1 comprising employing testosterone as starting material.

5. Process according to claim 1 comprising employing 21-hydroxy progesterone as starting material.

6. Process according to claim 1 comprising employing an halogenide of an aliphatic dibasic acid as esterifying agent.

7. Process according to claim 1 comprising employing succinic acid dichloride as esterifying agent.

8. Process according to claim 1 comprising employing glutaric acid dichloride as esterifying agent.

9. Process for the manufacture of neutral esters of steroid compounds containing hydroxy groups capable of being esterified, and polybasic acids, comprising converting an acid steroid ester of a dibasic carboxylic acid and a hydroxy steroid compound of the $C_{19}$ and $C_{21}$ series to the acid halide by reacting the acid ester with a halogenating agent, and then reacting the acid halide with a hydroxy steroid compound of said $C_{19}$ and $C_{21}$ series until a neutral ester is formed.

10. Process for the manufacture of neutral esters of steroid compounds containing at least one hydroxy group, comprising reacting a steroid alcohol of the $C_{19}$ and $C_{21}$ series with a polychloride of a polybasic carboxylic acid to form a neutral ester.

11. Process for the manufacture of neutral esters of steroid compounds containing at least one hydroxy group, comprising reacting the acid ester of a polybasic carboxylic acid and a steroid alcohol of the $C_{19}$ and $C_{21}$ series with a chlorinating agent to form the acid chloride of the acid ester, and reacting said acid chloride with said steroid alcohol to form a neutral ester.

12. Process for the manufacture of neutral esters of steroid compounds containing at least one hydroxy group, comprising reacting an anhydride of an aliphatic dicarboxylic acid and a steroid alcohol of the $C_{19}$ and $C_{21}$ series to form an acid ester, reacting said acid ester with a chlorinating agent to form the acid chloride of the acid ester, and reacting said acid chloride with a steroid compound containing at least one hydroxy group to form a neutral ester.

13. The neutral succinic ester of testosterone of a melting point of about 225° C., having a pronounced and prolonged androgenic activity.

14. The neutral glutaric ester of testosterone of a melting point of about 252° C., having a pronounced and prolonged androgenic activity.

15. A neutral ester of a hydroxy steroid compound of the $C_{19}$ and $C_{21}$ series and a dibasic carboxylic acid.

16. A neutral ester of a hydroxy steroid compound of the $C_{19}$ and $C_{21}$ series and an aliphatic dibasic carboxylic acid.

17. The neutral ester of a 21-hydroxy compound of the saturated and unsaturated pregnane series and a dicarboxylic acid.

HANS HERLOFF INHOFFEN.